(12) United States Patent
Nägele et al.

(10) Patent No.: US 6,509,397 B1
(45) Date of Patent: Jan. 21, 2003

(54) PLASTIC MATERIAL MADE FROM A POLYMER BLEND

(75) Inventors: Helmut Nägele, Pfinztal (DE); Jürgen Pfitzer, Pfitzer (DE); Norbert Eisenreich, Pfinztal (DE); Peter Eyerer, Karlsruhe (DE); Peter Elsner, Pfinztal (DE); Wilhelm Eckl, Karlsruhe (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 09/830,421

(22) PCT Filed: Nov. 9, 1999

(86) PCT No.: PCT/EP99/08584

§ 371 (c)(1),
(2), (4) Date: Jul. 11, 2001

(87) PCT Pub. No.: WO00/27923

PCT Pub. Date: May 18, 2000

(30) Foreign Application Priority Data

Nov. 11, 1998 (DE) .......................... 198 52 081

(51) Int. Cl.⁷ .......................... C10L 97/00; C10L 67/04
(52) U.S. Cl. .......................... 524/72; 524/29; 524/39; 524/47; 524/38
(58) Field of Search .......................... 524/29, 38, 39, 524/47, 72

(56) References Cited

U.S. PATENT DOCUMENTS

| | | | | |
|---|---|---|---|---|
| 2,355,180 A | * | 8/1944 | de Becker Remy | 106/124.1 |
| 3,632,362 A | * | 1/1972 | Urushiyama et al. | 427/126.3 |
| 4,419,392 A | * | 12/1983 | Bahr et al. | 346/135.1 |
| 5,382,609 A | * | 1/1995 | Lock | 156/283 |
| 5,997,784 A | * | 12/1999 | Karnoski | 264/101 |
| 6,284,838 B1 | * | 9/2001 | Silbiger | 524/13 |

FOREIGN PATENT DOCUMENTS

| | | | |
|---|---|---|---|
| DE | 1570363 | * | 6/1965 |
| DE | 1 570 363 | | 2/1970 |
| DE | 19852067 A | * | 10/2000 |
| EP | 0720634 B1 | * | 9/1994 |
| EP | 0 720 634 | | 7/1996 |
| GB | 0691608 | * | 5/1953 |
| JP | 59-179814 A | * | 3/1983 |
| JP | 581 42 837 | | 9/1993 |
| WO | WO 91 17199 | | 11/1991 |
| WO | WO 95 08594 | | 3/1995 |
| WO | WO 98-06785 | * | 2/1998 |
| WO | WO 98-13424 | * | 4/1998 |

OTHER PUBLICATIONS

Abstract JP 58142837 A UPAB 19930925, English Abstract.*
T.G. Rials et al.: "Multiphase materials with lignin. VI. Effect of cellulose derivative structure on blend morphology with lignin" Wood and Fiber Science, vol. 21, No. 1, 1989, pp. 80–90, XP000889708 Abstract.

* cited by examiner

Primary Examiner—Margaret Medley
(74) Attorney, Agent, or Firm—Paul Vincent

(57) ABSTRACT

A plastic material made from a polymer blend, is characterized in that said material contains at least one lignin-based natural polymer, in particular based on alkali lignin produced during the extraction of cellulose, and at least one other synthetic and/or natural polymer which increases the impact resistance, proteins excluded. The inventive plastic material has excellent characteristics. It is biodegradable due to the natural polymer content and has, to a considerable extent, an ecologically neutral $CO_2$ balance. The polymer blend can be used advantageously in place of wood or wood materials.

12 Claims, No Drawings

PLASTIC MATERIAL MADE FROM A POLYMER BLEND

BACKGROUND OF THE INVENTION

The invention concerns a plastic material made from a polymer blend and its use.

The use of blends which consist of different polymers and are generally produced through mixing of a corresponding polymer molten mass is very important in plastic processing. The combination of different polymers permits, in particular, combination of the properties of the two polymer components favorable for the intended use of the plastic or to emphasize the desired material properties of one polymer component while compensating for the undesired material properties of the other component to a certain extent, in dependence on the mixing ratio. It is possible to provide plastic materials whose properties can be adjusted to the appropriate technical use.

Plastic materials which consist of synthetic polymers are frequently used to produce ephemeral commercial goods. Recycling is very expensive, in particular because separation of the different plastic materials is difficult. This fact and the necessity to save the limited mineral oil resources from which the basic materials of the plastic synthesis are gained, leads to the wish of replacing synthetic polymers with natural polymers. This aim is made even more attractive by the fact that burning of synthetic plastic materials, which is often the only possibility of waste disposal, produces considerable amounts of $CO_2$, often accompanied by toxic emissions. In contrast thereto, polymers of growing natural raw materials have an ecologically neutral $CO_2$ balance since burning of natural polymers does not release more $CO_2$ into the atmosphere than is withdrawn during growth of the raw materials. Moreover, in particular biologically degradable or compostable natural polymers are of primary interest because they can be degraded generally without residues and in a considerably shorter time than most synthetic polymers.

There are a plurality of known plastic materials based on natural polymers or natural polymers modified through oxidation, enzyme treatment or the like, such as duroplasts made from casein or thermoplasts made from cellulose nitrates, acetates, esters, and ethers. A disadvantage of many known natural plastic materials is their hygroscopic capacity which is further increased by added softeners. In addition, production thereof requires high temperatures of approximately 200° C. thereby requiring a relatively large amount of energy. Moreover, such plastic materials are often odorous and have worse material properties than synthetic materials.

Lignin is a natural polymer with considerably improved material properties compared to other natural polymers, and is characterized by a relatively high strength, rigidity, impact strength and high resistance with respect to ultra-violet light. Lignin is also a suitable material for heat and sound insulation. Lignin is a high molecular polyphenolic macromolecule which fills the spaces between the cell membranes of ligneous plants and turns them into wood thereby producing a mixed body of pressure-resistant lignin and cellulose having good tensile strength. Depending on the type of wood, the phenyl groups of the lignin can be substituted by up to two methoxy groups and the propyl groups by up to two hydroxyl groups.

Large quantities of lignin are produced as a by-product in cellulose production and are therefore available in large amounts. Disintegration of wood produces lignosulphonic acids as part of the sulfite waste liquor in which the lignosulphonic acids are dissolved in the form of phenolates ("alkali lignin"). The lignin acid can be precipitated through treatment with sulfuric acid and carbon dioxide.

In particular, alkali lignin from the cellulose industry is already used as a binding agent for hardboard made from wood and cellulose, as a dispersing agent, and as a stabilizer in asphalt emulsions.

DE 197 00 902 A1, DE 197 00 903 A1, DE 197 00 905 A1, DE 197 00 907 A1 and DE 197 01 015 A1 disclose an intermediate product for the production of polymerisates from lignin derivatives which are produced in the cellulose industry, wherein lignin derivatives are reacted with phenol oxidizing enzymes in the presence of oxidizing agents such as oxygen. This intermediate product is used as a coating agent for the production of water-proof papers and cartons, as a coating agent or binding agent for the production of particle board, as a binding agent for starch for the production of water-proof starch derivatives, as an insulating material, and as a component of a composite material enriched with plant fibers.

EP 0 720 634 B1 discloses a natural granulated material which is produced from alkali lignin and proteins or protein derivatives, which can be decayed and composted, and which is produced through stereochemical modification through treatment with organic acids, in particular acetic acid. This material can be thermoplastically processed into structural parts.

WO 98/06785 describes a similar composition, wherein lignin and a protein are heated and melted. This material is not suitable for most purposes since proteins are odorous and frequently hygroscopic, even when processed.

It is the underlying purpose of the invention to present a new polymer blend material which is characterized by excellent material properties and which has a favorable $CO_2$ balance.

This object is achieved in accordance with the invention with a plastic material made from a polymer blend which comprises at least one natural polymer on the basis of lignin and at least one synthetic and/or natural polymer to increase impact strength, with the exception of proteins.

Due to its wide availability, powdery alkali lignin, as extracted from the treatment of cellulose processing waste water through evaporation, or dissolved in alcohol, such as glycol, is preferably used for producing the polymer blend. Exclusion of proteins renders the inventive plastic material long-lasting and largely non-odorous.

Almost all known synthetic thermoplastic materials can be used as synthetic polymer components for increasing the impact strength, e.g. polyethylenes, polypropylenes etc. or thermoplastic elastomers (thermoelastics), e.g. polystyrene, polybutadiene, isoprene etc. The synthetic polymers may also contain additional substances such as softeners (phthalates, adipates, alkyl phosphates or the like) which permits use of even hard synthetic polymers, such as PVC.

Possible natural polymers which increase the impact strength are preferably polylactide, polyhydroxyl butyrate and/or—valerate, cellulose acetate and/or acetopropionate or starch, in particular having a high amylose content.

The inventive blend can be produced in a conventional manner in a molten state, wherein temperatures above 200° C. must be avoided to prevent damage, in particular, to the natural polymers. The selection of the polymers increasing the impact strength is limited only by this upper temperature boundary. Production can be carried out e.g. using extruders, wherein the polymer components can be added separately from separate metering systems or a synthetic and/or natural polymer or a polymer blend is introduced and lignin is added. The inventive plastic material has material properties which distinguish it from many purely synthetic plastic materials and plastic mixtures, as well as from known plastic materials containing natural polymers. In particular, the plastic material has high UV resistance, high strength, high rigidity and high impact strength. While the increased strength, increased impact strength and improved processing capability compared to pure lignin, is caused by the respective synthetic and/or natural polymer component, it is the lignin portion which gives the material its high rigidity, its heat and sound insulating properties and its high UV resistance which renders addition of anti-oxidizing agents largely unnecessary. The lignin portion gives the material a wood-like character which is desired for many applications.

SUMMARY OF THE INVENTION

In a preferred embodiment, the lignin portion of the inventive plastic material is between 2 and 90 mass %, in particular between 5 and 65 mass %. Variation of the lignin portion produces changes in the material properties and adaptation to the respective application, wherein the largely ecologically neutral $CO_2$ balance and the biological degradability or decay increases with an increasing portion of lignin or of the additional natural polymers.

DESCRIPTION OF THE PREFERRED EMBODIMENT

The plastic material may furthermore include synthetic reinforcing fibers (e.g. glass, polyamide, aramide or carbon fibers) as well as natural reinforcing fibers (e.g. flax, sisal, cellulose, wood, miscanthus or hemp fibers) which increase the tensile strength of the material. The use of natural reinforcing fibers is preferred due to the neutral $CO_2$ balance and the use of hemp fibers is preferred due to the resulting high tensile strength. The fibers can be directly added to an extruder when mixing the polymer components.

A further increased tensile strength can be achieved, alternatively or additionally, when particulate, e.g. ground chitin, is added to the inventive plastic material.

As mentioned above, the inventive plastic material is suitable for many applications. It is suitable as a substitute for wood or wooden materials due to its various properties, color and consistency. Due to its good heat and sound insulating properties, the plastic material is particularly suitable for the production of structural components such as profiles, e.g. for windows or door frames, for door inner linings etc. Conventional hollow profiles for windows produced from hard PVC with inserted aluminum reinforcements represent a considerable environmental problem with regard to disposal, since the composite metal and plastic material is very difficult to separate into pure substances and therefore difficult to recycle. In addition, burning of PVC produces toxic compounds such as polychlorified dioxins and furanes. In contrast thereto, due to its neutral $CO_2$ balance, the biologically degradable natural polymer is less damaging to the environment, even when burned.

The inventive material is also suitable for the production of profiles or structural parts for furniture due to its wood-like character and, in particular, for garden furniture due to its high UV light and moisture resistance. The material can e.g. also be used for producing housings for electric or electronic devices e.g. TV and radio sets or the like. It may furthermore also be lacquered, painted or veneered. In the latter case, the lignin-portion of the plastic material provides high affinity to a wooden veneer.

The invention is explained in more detail below with reference to an embodiment.

EMBODIMENT

A mixture of 30% powdery lignin, 20% powdery polyethylene and 50% hemp fibers is processed at 170° C. and shaped at 1500 bar in an injection molding process. The injection-molded shaped body has an improved impact strength compared to that of a pure lignin fiber compound and an increased UV stability compared to that of pure polyethylene shaped parts. The impact strength increases from 2 to 5 $kJ/mm^2$ to 5 to 30 $kJ/mm^2$. At the same time, the rigidity decreases compared to that of pure lignin compounds, from approximately 4000 to 7000 $N/mm^2$ to approximately 2000 to 4000 $N/mm^2$. This rigidity is nevertheless sufficient for many technical applications.

We claim:

1. A method for producing a housing wherein portions of said housing consist essentially of a plastic material made from a polymer blend, the method comprising the step of:

providing a housing, and providing portions of said housing with a plastic material consisting essentially of a blend of at least one natural polymer on the basis of lignin and at least one of a synthetic polymer and a natural polymer having a high impact strength in excess of that of lignin, with the exclusion of proteins.

2. The method of a of claim 1, wherein said housing is one of an electric device housing and an electronic device housing.

3. The method of claim 1, wherein said lignin is an alkali lignin.

4. The method of claim 1, wherein said polymer having high impact strength is a natural polyactide polymer.

5. The method of claim 1, wherein said polymer having high impact strength is at least one of a natural polyhydroxybutyrate polymer and a natural polyhydroxyvalerate polymer.

6. The method of claim 1, wherein said polymer having high impact strength is at least one of a natural cellulose acetate polymer and a natural cellulose acetopropionate polymer.

7. The method of claim 1, wherein said polymer having high impact strength is a natural starch polymer.

8. The method of claim 1, wherein a lignin portion of said polymer blend is 2 to 90 mass %.

9. The method of claim 8, wherein a lignin portion of said polymer blend is 5 to 65 mass W.

10. The method of claim 1, wherein said polymer blend further comprises synthetic reinforcement fibers.

11. The method of claim 1, wherein said polymer blend further comprises natural reinforcing fibers.

12. The method of claim 1, wherein said polymer blend further comprises particulate chitin.

* * * * *

UNITED STATES PATENT AND TRADEMARK OFFICE
CERTIFICATE OF CORRECTION

PATENT NO. : 6,509,397 B1
DATED : January 21, 2003
INVENTOR(S) : Nägele, Helmut et al.

It is certified that error appears in the above-identified patent and that said Letters Patent is hereby corrected as shown below:

Title page,
Item [75], please correct the city of residence of inventor "Jürgen Pfitzer" to replace "Pfitzer" with -- Pfinztal --.
Item [73], please add the following Assignee:
-- Tecnaro Gesellschaft zur Industriellen Anwendung nachwachsender Rohstoffe mbH, Eisenach (DE) --.

Column 4,
Line 55, please correct the second line of claim 9 to replace "mass w" with -- mass % --.

Signed and Sealed this

Eighth Day of April, 2003

JAMES E. ROGAN
*Director of the United States Patent and Trademark Office*